US007321782B2

(12) United States Patent
Fujii

(10) Patent No.: US 7,321,782 B2
(45) Date of Patent: Jan. 22, 2008

(54) RELAY APPARATUS

(75) Inventor: Kohei Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 519 days.

(21) Appl. No.: 10/621,583

(22) Filed: Jul. 18, 2003

(65) Prior Publication Data

US 2004/0018813 A1 Jan. 29, 2004

(30) Foreign Application Priority Data

Jul. 24, 2002 (JP) .............................. 2002-215434

(51) Int. Cl.
*H04M 1/00* (2006.01)
(52) U.S. Cl. .................. 455/556.1; 455/557; 455/7
(58) Field of Classification Search ............... 455/11.1, 455/556, 557, 569, 568, 572, 556.1, 7, 13.1, 455/16; 370/226, 243, 246, 293, 315, 492, 370/501, 75
See application file for complete search history.

(56) References Cited

U.S. PATENT DOCUMENTS

| 5,983,073 | A * | 11/1999 | Ditzik ........................ 455/11.1 |
| 6,128,293 | A | 10/2000 | Pfeffer |
| 6,434,402 | B1 | 8/2002 | Davison et al. |

FOREIGN PATENT DOCUMENTS

| DE | 198 00 967 A 1 | 7/1999 |
| EP | 0 849 965 A1 | 12/1996 |
| EP | 0 923 216 | 6/1999 |
| JP | 7-162555 | 6/1995 |
| JP | 10-65773 | 3/1998 |
| JP | 11-252254 | 9/1999 |
| JP | 2000-295366 | 10/2000 |
| JP | 2001-245064 | 9/2001 |
| JP | 2001-298785 | 10/2001 |
| WO | WO 02/15542 | 2/2002 |

OTHER PUBLICATIONS

European Search Report dated Sep. 29, 2003.
Abstract "Cordless telephone" dated Jun. 24, 1998.
United Kingdom Search Report dated Aug. 18, 2005.
United Kingdom Search and Examination Report dated Apr. 20, 2006.
An Office Action issued by the Japanese Patent Office on Dec. 12, 2006, in Japanese and English languages, pp. 1-5.

* cited by examiner

*Primary Examiner*—Tu Nguyen
(74) *Attorney, Agent, or Firm*—Whitham Curtis Christofferson & Cook, PC

(57) ABSTRACT

A relay apparatus includes an external connection interface section and common terminal section. A plurality of communication sections are connected to the external connection interface section. The external connection interface section individually interfaces with the communication sections. The common terminal section is commonly provided for the communication sections and controls to perform communication by using one of the communication sections connected to the external connection interface section in accordance with operation by a user.

14 Claims, 7 Drawing Sheets

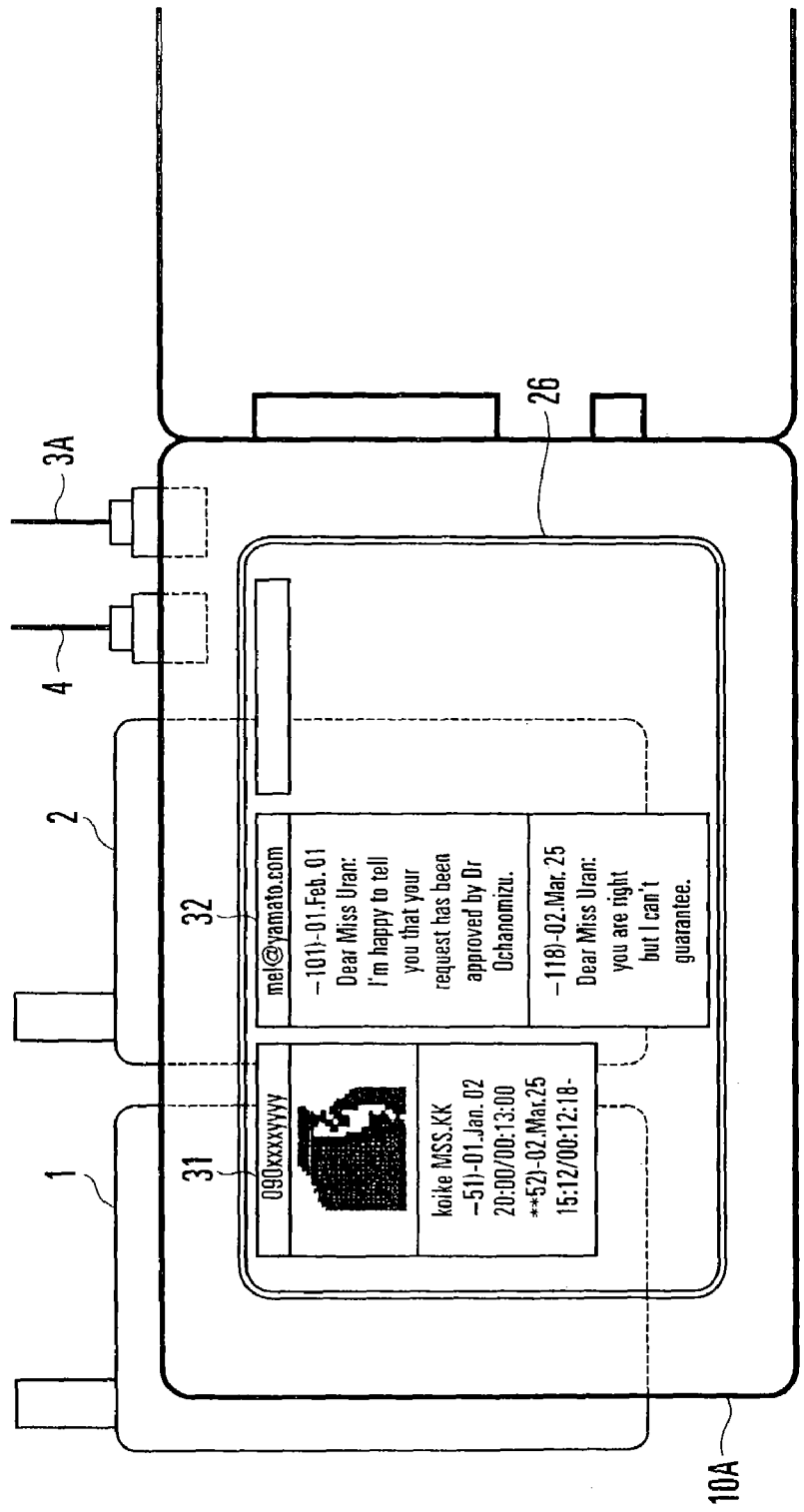

RELAY APPARATUS

BACKGROUND OF THE INVENTION

The present invention relates to a relay apparatus and, more particularly, to a relay apparatus for allowing various kinds of communication means to be used under a common environment.

Currently, along with the diversification of communication routes and media and the trend toward multimedia and sophisticated information, many communication terminals corresponding to these communication forms have been proposed. For example, portable terminals handle texts and images in the form of electronic mail as well as speech. Fixed telephone terminals are also following the same tendency.

In addition, as these communication terminals tend to handle multimedia information, functions provided for the communication terminals themselves increase in number and complexity to effectively use these pieces of information. The amount of information handled by each function also increases.

Furthermore, various types of communication lines have been provided for users, including, for example, ISDN lines, ADSL lines, and optical cable lines as well as general telephone lines (analog telephone lines) to which fixed telephone terminals are connected.

Such communication means as communication terminals and communication lines are, however, independent means respectively connected to different communication routes or communication media, and hence have unique specifications. This makes it impossible for a user to efficiently and effectively use a plurality of communication means.

For example, some communication terminals are designed to handle the same kind of information. However, such terminals differ in their operation methods and functions depending on the types or makers of terminals. When, therefore, a user is to use a plurality of communication terminals, he/she must properly use the communication terminal upon grasping the operation methods and functions of the respective communication terminals. This imposes a heavy workload on the user.

This applies to the case of communication lines. A user must properly use terminals corresponding to the respective lines, resulting in a load on the user.

Furthermore, communication information such as communication partner information or communication contents handled in each communication terminal is independently managed by each communication terminal. This makes it impossible for a user to commonly and effectively use such management information. The user must copy a telephone directory or make matching among a plurality of telephone numbers. This imposes a heavy management load on the user.

This applies to the case of communication lines. As information for identifying the same communication partner, different pieces of identification information such as a telephone number and network address must be used depending on communication lines. A heavy load is therefore placed on the user.

SUMMARY OF THE INVENTION

It is an object of the present invention to provide a relay apparatus which can efficiently use a plurality of communication means and effectively use communication information handled in each communication means.

According to the present invention, there is provided a relay apparatus comprising external connection interface means to which a plurality of communication means are connected and which individually interfaces with the communication means, and common control means which is commonly provided for the plurality of communication means and controls to perform communication by using one of the plurality of communication means connected to the external connection interface means in accordance with operation by a user.

BRIEF DESCRIPTION OF THE DRAWINGS

FIG. 7 is a view showing a display example on a window display section.

DESCRIPTION OF THE PREFERRED EMBODIMENT

An embodiment of the present invention will be described next with reference to the accompanying drawings.

Figure 1:
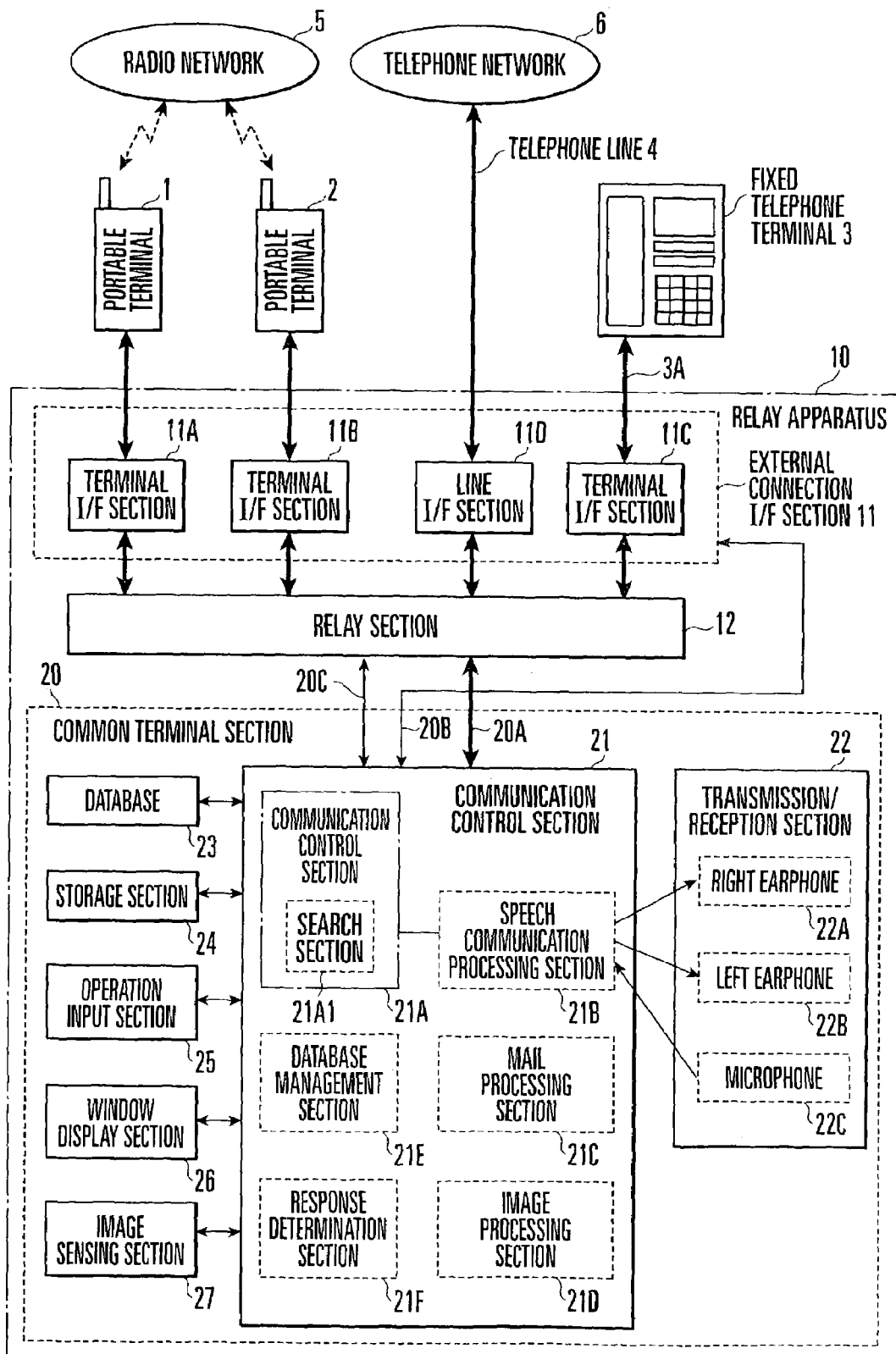
FIG. 1 is a block diagram showing the arrangement of a relay apparatus according to an embodiment of the present invention.

As shown in FIG. 1, a relay apparatus 10 according to an embodiment of the present invention is connected to portable terminals 1 and 2, fixed telephone terminal 3, and telephone line 4 which are generally used as communication means by a user.

The portable terminals 1 and 2 perform radio communication through a radio network 5. The fixed telephone terminal 3 is connected to the telephone line 4. The telephone line 4 is connected to a telephone network 6.

Using the relay apparatus 10 allows the user to use the respective communication means including the portable terminals 1 and 2, fixed telephone terminal 3, telephone line 4, and the like with common operation. This also makes possible collective management and common use of communication information used in the respective communication means.

The relay apparatus 10 includes an external connection interface section (to be referred to as an external connection I/F section hereinafter) 11, relay section 12, and common terminal section 20.

The external connection I/F section 11 independently controls each of the communication means such as communication terminals and communication line connected to the relay apparatus 10. The external connection I/F section 11 includes separate interface sections for the respective communication means.

In this case, the external connection I/F section 11 includes a terminal interface section (to be referred to as a terminal I/F section hereinafter) 11A for controlling the portable terminal 1, a terminal interface section (to be referred to as a terminal I/F section hereinafter) 11B for controlling the portable terminal 2, a terminal interface section (to be referred to as a terminal I/F section hereinafter) 11C for controlling the fixed telephone terminal 3, and a line interface section (to be referred to as a line I/F section hereinafter) 11D for controlling the telephone line 4.

The relay section 12 relays/connects the respective terminal I/F sections 11A to 11C of the external connection I/F section 11 and the line I/F section 11D to the common terminal section 20 commonly used by the respective communication means.

In this case, each of the I/F sections 11A to 11D and the common terminal section 20 can be one-to-one-connected through a signal line 20C, the plurality of I/F sections 11A to 11D and the common terminal section 20 can be many-to-one-connected through a signal line 20A, or the I/F sections 11A to 11D can be connected to each other.

The common terminal section 20 is commonly provided for the respective communication means connected to the external connection I/F section 11, and performs various kinds of communication such as speech communication, electronic mail communication, and image communication.

The common terminal section 20 includes a communication control section 21 connected to the external connection I/F section 11, a transmission/reception section 22 connected to the communication control section 21, a database (to be referred to as a DB hereinafter) 23 connected to the communication control section 21, a storage section 24, an operation input section 25, a window display section 26, and an image sensing section 27.

The communication control section 21 is a common function processing section for controlling various kinds of communication performed by the respective communication means. The communication control section 21 is comprised of a microprocessor such as a CPU (Central Processing Unit), its peripheral circuits, and a communication circuit such as a speech communication circuit.

The communication control section 21 controls the respective sections of the relay apparatus 10 by executing programs stored in advance in the storage section 24.

The communication control section 21 includes a call control section 21A for controlling various kinds of communication calls, a speech communication processing section 21B which is connected to the transmission/reception section 22 to perform speech communication, a mail processing section 21C for exchanging electronic mail, an image processing section 21D for performing image communication, a database management section 21E for managing the database 23, and a response determination section 21F for determining whether to make a response to an incoming call.

The call control section 21A, in particular, performs call control for the respective communication means on the basis of specifications (interface information) set in advance by the user in accordance with the types and models of the respective communication means.

Note that the specifications of the respective communication means may be stored in the database 23 in advance, or may be externally stored in the database 23.

The transmission/reception section 22 is a speech transmission/reception interface section by which the user performs speech communication through the speech communication processing section 21B. In this case, the transmission/reception section 22 includes a right earphone 22A and left earphone 22B as reception means, and a microphone 22C as a transmission means.

Note that as the transmission/reception section 22, a handset may be used, which is obtained by integrating these transmission means and reception means.

The DB 23 commonly performs collective management of communication information such as communication partner information and log information used for communications in the respective communication means.

In this case, the following pieces of information are collected from the respective communication terminals and collectively managed: the cell phone numbers or mail addresses of communication partners which are obtained from the portable terminals 1 and 2, the fixed telephone numbers or electronic mail addresses of communication partners which are obtained from the fixed telephone terminal 3, and communication partner information such as the names of communication partners.

In addition to information associated with communication partners, multimedia information such as mail, image data, and speech data exchanged with the communication partners, and communication log information are collectively managed.

The contents of various kinds of filter settings are registered in the DB 23 in accordance with setting operation by the user. The information set by this filter setting for each telephone number includes limitations on origination and utilization time, call rejection and call limitations, association with a ringing tone, termination propriety information, and the like. Termination propriety information, in particular, is used to determine whether to respond to a new incoming call from another communication partner during speech communication.

In addition, user information about the user is also managed, which includes, for example, the cell phone number, fixed telephone number, cell phone mail address, and electronic mail address of the user who uses this relay apparatus.

The communication information held in each communication terminal is loaded into the relay apparatus 10 and stored in the DB 23 when each communication terminal is connected to the relay apparatus 10. Communication information about a desired communication partner is retrieved from the DB 23 as needed to be used in the communication control section 21 or displayed on the window display section 26.

The storage section 24 is a memory which stores control information used for control processing in the communication control section 21. In addition to the control information, the storage section 24 stores programs, format data, and the like.

The operation input section 25 is an input interface section for detecting operation by the user. The operation input section 25 includes a keyboard having various keys such as dial keys, touch keys arranged on the window display section 26, and a pointing device such as a mouse.

The window display section 26 is a window display device such as an LCD device, on which various kinds of information are displayed, including communication information such as mail contents and image data handled by the communication control section 21, communication information read out from the DB 23 in association with a communication partner, and management information in the relay apparatus 10.

The image sensing section 27 is a compact camera which senses an image of the user when image communication such as videophone communication is performed using a moving or still image.

Figure 2:
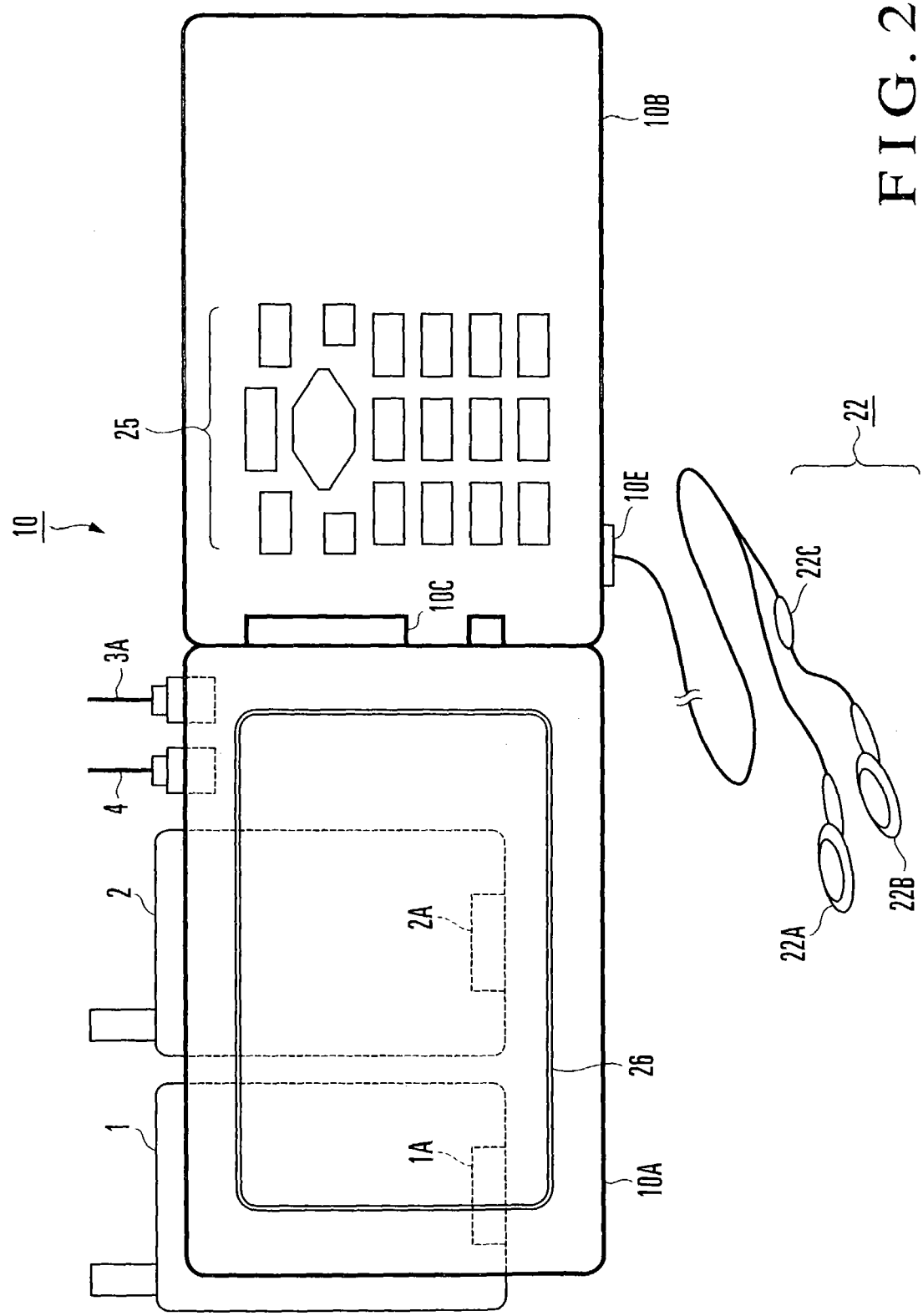
FIG. 2 is a view showing an outer appearance of the relay apparatus.

As shown in FIG. 2, the relay apparatus 10 is comprised of a main body 10A formed from a rectangular housing and a lid member 10B openably supported on the main body 10A through a hinge section 10C.

While the relay apparatus 10 is not in use, the lid member 10B is closed onto the main body 10A. When the relay apparatus 10 is to be used, the lid member 10B is opened.

The window display section 26 is placed on the upper surface of the main body 10A. Spaces (not shown) are formed in the main body 10A so as to be open to its side surface and partly house the portable terminals 1 and 2.

In general, the portable terminals 1 and 2 have connectors 1A and 2A for connecting to external information communication devices. These connectors are used for connection to the terminal I/F sections 11A and 11B of the relay apparatus 10.

The relay apparatus 10 may be connected to the portable terminals 1 and 2 through communication cables. However, forming spaces in the relay apparatus 10 and connecting the terminals thereto by housing them in the spaces can save the space required to use the relay apparatus 10.

Since the portable terminals 1 and 2, in particular, are compact, only relatively small spaces need to be formed in the relay apparatus 10. In addition, these spaces can be used as places where the portable terminals 1 and 2 are to be placed while the user is at home. When the portable terminals 1 and 2 are housed in the spaces, the batteries in the portable terminals 1 and 2 may be charged from the relay apparatus 10.

A connection line 3A and the telephone line 4 for the fixed telephone terminals 3 are connected to connectors (modular jacks) provided on a side surface portion of the main body 10A. Note that if the fixed telephone terminals 3 have connectors similar to those of the portable terminals, connectors corresponding to them are used, respectively.

The respective keys of the operation input section 25 are arranged on a surface of the lid member 10B which becomes an upper surface in an open state. A connector 10E to which the transmission/reception section 22 is connected is provided on a side surface portion of the lid member 10B.

The operation of the relay apparatus 10 according to this embodiment will be described next with reference to the accompanying drawings.

Figure 3:
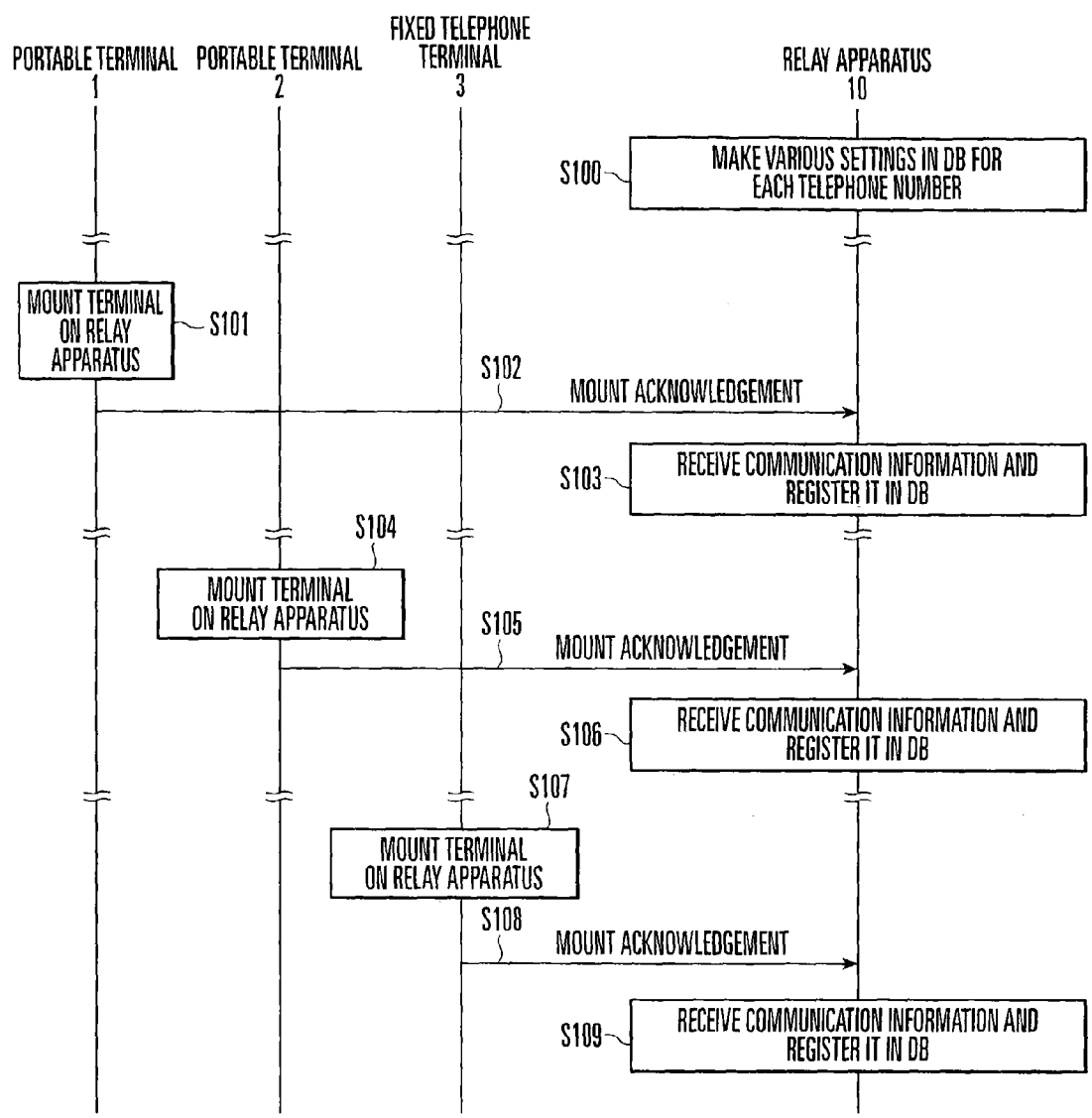
FIG. 3 is a sequence chart showing operation for a case wherein terminal devices are mounted.

A case wherein the portable terminals 1 and 2 and fixed telephone terminal 3 are mounted in the relay apparatus 10 will be described first with reference to FIG. 3.

The relay apparatus 10 performs various kinds of filter settings for each telephone number of the user, i.e., each of the telephone numbers of the portable terminals 1 and 2 and fixed telephone terminal 3, in accordance with operation by the user which is detected by the operation input section 25, and registers the settings in the DB 23 in advance (step S100).

In the filter settings, items associated with originating/terminating operation using each telephone number are set for each telephone number, which include limitations on origination and utilization time, call rejection and call limitations, association with a ringing tone, and the like.

When the portable terminal 1 is mounted on the relay apparatus 10 (step S101), the call control section 21A of the relay apparatus 10 detects the mounting operation through a signal line 20B and the terminal I/F section 11A of the external connection I/F section 11.

In response to an acknowledgement of being mounted from the portable terminal 1 (step S102), the relay apparatus 10 receives communication information stored in the portable terminal 1 and registers the information in the DB 23 (step S103).

Likewise, when the portable terminal 2 is mounted on the relay apparatus 10 (step S104), the relay apparatus 10 receives communication information stored in the portable terminal 2 and registers it in the DB 23 (step S106) in response to an acknowledgement of being mounted from the portable terminal 2 (step S105).

When the fixed telephone terminal 3 is mounted on the relay apparatus 10 (step S107), the relay apparatus 10 receives communication information stored in the fixed telephone terminal 3 and registers it in the DB 23 (step S109) in response to an acknowledgement of being mounted from the fixed telephone terminal 3 (step S108).

In this manner, the relay apparatus 10 acquires, from the respective communication terminals mounted thereon, various kinds of communication information stored in the respective communication terminals, i.e., attribute data having telephone numbers as keys such as telephone directory, Internet addresses, and their attribute data. The relay apparatus 10 registers these pieces of information in the DB 23.

The database management section 21E manages various kinds of data registered in the DB 23. As a consequence, in the DB 23, these pieces of communication information are collectively managed on the basis of telephone numbers, cell phone mail addresses, electronic mail addresses, or the names of communication partners.

Figure 4:
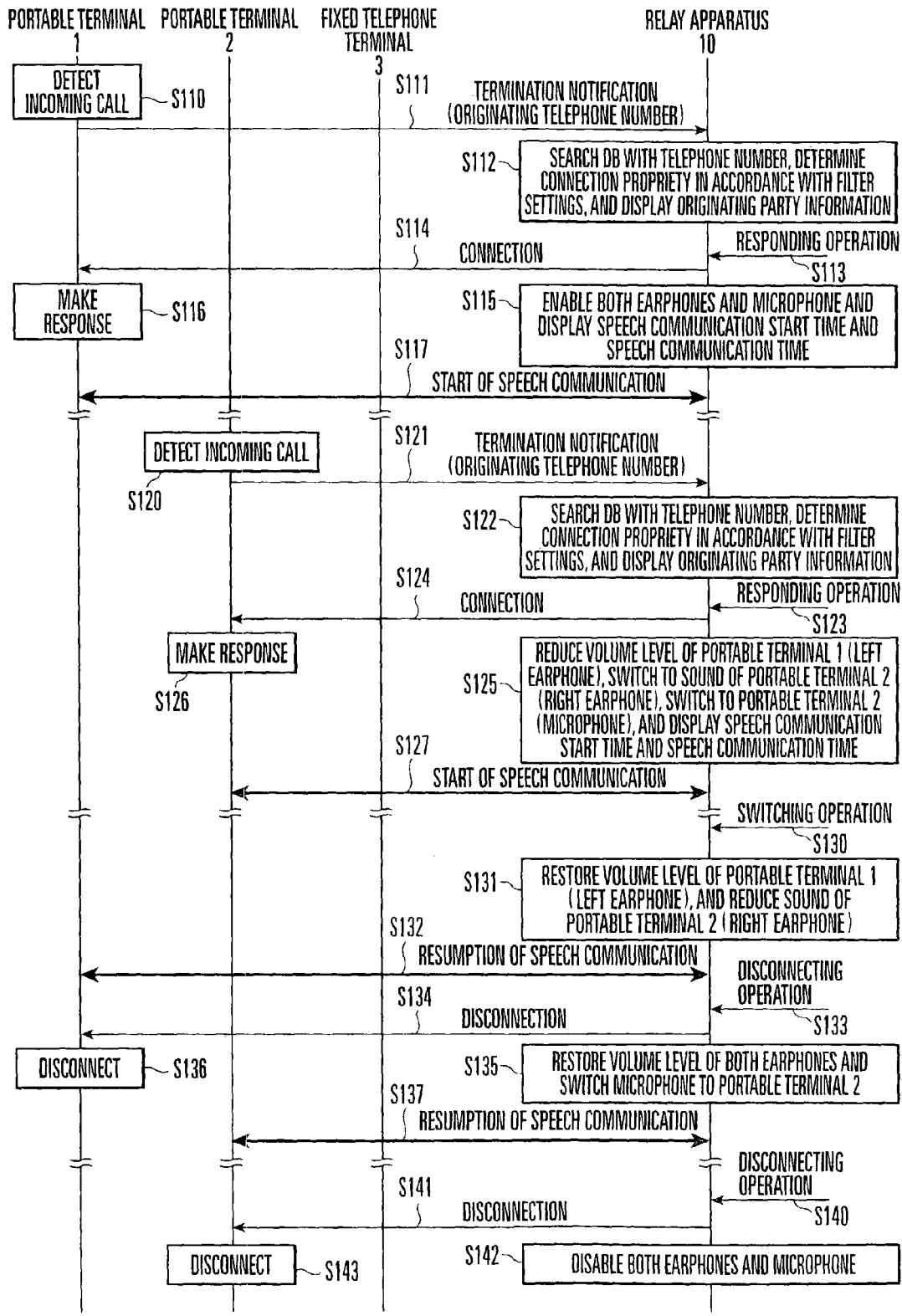
FIG. 4 is a sequence chart showing operation for a case wherein general speech communication is performed.

Operation for general speech communication will be described next with reference to FIG. 4. Consider a case wherein after speech communication with the portable terminal 1 is ended in response to an incoming call to the portable terminal 2 during the speech communication with the portable terminal 1, speech communication with the portable terminal 2 is started.

The following operation is based on the assumption that mounting of the portable terminals 1 and 2 and fixed telephone terminal 3 has already been completed by the operation described with reference to FIG. 3.

When the portable terminal 1 detects a speech incoming call from the radio network 5 (step S110), the portable terminal 1 notifies the relay apparatus 10 of detection of the incoming call and termination telephone number as a termination notification (step S111). A search section 21A1 of the call control section 21A of the relay apparatus 10 searches the DB 23 by using the termination telephone number notified from the network side as a key.

With this key search, filter settings registered for each telephone number are read out to obtain display data as connection determination information. Likewise, an image and connection log are obtained as attribute information registered in the DB 23.

As shown in FIG. 7, the connection determination information and attribute information are displayed in a display area 31 set on a portion of the window display section 26 which is located near the portable terminal 1 (step S112).

The user of the relay apparatus 10 then performs responding operation to receive a call (step S113). The call control section 21A detects this responding operation through the operation input section 25, and issues a connection instruction to the portable terminal 1 through the terminal I/F section 11A (step S114).

The relay apparatus 10 then controls the relay section 12 to connect the terminal I/F section 11A to the speech communication processing section 21B of the communication control section 21, and activates the speech communication processing section 21B. In response to this operation, the speech communication processing section 21B enables the right earphone 22A, left earphone 22B, and microphone 22C of the transmission/reception section 22, and starts displaying the speech communication start time and speech communication time in the display area 31 (step S115).

In response to the connection instruction, the portable terminal 1 responds to the speech incoming call from the radio network 5 (step S116) and exchanges speech between the radio network 5 and the relay apparatus 10.

With this operation, the speech received from the radio network 5 through the portable terminal 1, terminal I/F section 11A, and relay section 12 is output from the right earphone 22A and left earphone 22B. In addition, the speech input from the user to the microphone 22C is transmitted from the portable terminal 1 to the radio network 5 through the reverse route, thereby starting communication with the originating party by using the relay apparatus 10 (step S117).

In this manner, when the portable terminal 2 detects a speech incoming call from the radio network 5 while the user is performing speech communication through the portable terminal 1 by using the relay apparatus 10 (step S120), the portable terminal 2 notifies the relay apparatus 10 of detection of the incoming call and termination telephone number as a termination notification (step S121).

In subsequent steps S122 to S127, the relay apparatus 10 and portable terminal 2 operate in the same manner as in steps S112 to S117 described above, thereby allowing the user to perform speech communication through the portable terminal 2 using the relay apparatus 10.

The window display section 26 starts displaying connection determination information, attribute information, speech communication start time, and speech communication time in the display area 32 set near the portable terminal 2 in the same manner as described above.

In connection propriety determination based on filter settings in step S122, the response determination section 21F of the communication control section 21 reads out termination propriety condition information corresponding to the speech communication partner of the portable terminal 1 from the DB 23, and determines the propriety of responding to the incoming call to the portable terminal 2.

This makes it possible to reject any incoming call during speech communication with an important speech communication partner such as a customer and continue important speech communication.

In contrast to this, if an incoming call is sent from an important speech communication partner during speech communication with a general speech communication partner, the reception of the incoming call can be permitted. At this time, information about the originating party is displayed on the window display section 26 to allow the user to properly determine the necessity to switch speech communication.

When the user responds to the incoming call, since speech communication through the portable terminal 1 has been done before the reception of the incoming call at the portable terminal 2, the relay apparatus 10 controls the relay section 12 to connect the terminal I/F section 11B to the speech communication processing section 21B of the communication control section 21 in step S125.

Subsequently, the relay apparatus 10 reduces the volume level of speech communication through the portable terminal 1 which is produced from one of the earphones, e.g., the right earphone 22A, and switches to the sound of speech communication through the portable terminal 2 which is produced from the other earphone, i.e., the left earphone 22B.

The relay apparatus 10 also switches the microphone 22C to the speech communication mode through the portable terminal 2. The relay apparatus 10 decreases the brightness of the display area 31 of the window display section 26 which is used for the portable terminal 1.

This operation makes it possible to perform succeeding speech communication through the portable terminal 2 without disconnecting the preceding speech communication through the portable terminal 1. In addition, the user can listen to speech from the communication partner on the portable terminal 1 side with a level at which no interruption occurs. This allows the user to grasp the condition of the speech communication partner on the portable terminal 1 and cope with an emergency.

When the user performs switching operation to switch from the speech through the portable terminal 2 to that through the portable terminal 1 (step S130), the call control section 21A of the relay apparatus 10 restores volume level of the right earphone 22A on the portable terminal 1 to a normal conversation level. The call control section 21A then reduce the volume level of the left earphone 22B on the portable terminal 2, and switches the microphone 22C to the portable terminal 1 side (step S131).

With this operation, the speech communication on the portable terminal 1 is resumed (step S132).

If the speech communication on the portable terminal 1 is to be disconnected first, the user performs speech communication disconnecting operation on the portable terminal 1 side (step S133).

In response to this operation, a disconnection instruction is transmitted to the portable terminal 1 (step S134). The relay apparatus 10 then restores the volume levels of the right earphone 22A and left earphone 22B, switches the microphone 22C to the portable terminal 2 side, and controls the relay section 12 to disconnect the terminal I/F section 11A from the speech communication processing section 21B (step S135).

In response to the above disconnection instruction, the portable terminal 1 disconnects the speech communication (step S136). With this operation, the speech communication on the portable terminal 1 side is disconnected, and the speech communication on the portable terminal 2 side is resumed (step S137).

Subsequently, in response to the disconnecting operation by the user, the relay apparatus 10 transmits a disconnection instruction to the portable terminal 2 (step S141). The relay apparatus 10 also disables the right earphone 22A, left earphone 22B, and microphone 22C, and controls the relay section 12 to disconnect the terminal I/F section 11B from the speech communication processing section 21B (step S142).

In addition, in response to the above disconnection instruction, the speech communication on the portable terminal 2 is disconnected (step S143). With this operation, all the speech communication using the relay apparatus 10 is ended.

As described above, the relay apparatus 10 includes the external connection I/F section 11 for individually controlling the respective communication means, and the common terminal section 20 which realizes various kinds of communications. In addition, the relay apparatus 10 arbitrarily switches and connects the respective communication means and the communication control section 21 through the relay section 12. This makes it possible to cope with various kinds of communication means by using the common terminal section 20.

Even if, therefore, communication terminals differ in their operation methods and functions depending on the types and makers of the communication terminals as in prior art, the user is only required to operate the common terminal section 20.

The user need not selectively use the respective communication terminals upon grasping their operation methods and functions. This can greatly reduce the operation load on the user. This also applies to the case of communication lines; there is no need to selectively use devices corresponding to the respective lines. This makes it possible to reduce the load on the user.

In addition, the DB 23 is provided for the common terminal section 20 to collectively manage communication information individually held in each communication terminal. Therefore, even if, for example, an incoming call is received from an originating party registered in a communication terminal different from the one in use, information about the originating party can be retrieved from the DB 23 and displayed. Communication information individually managed in each communication terminal can be efficiently used.

This also applies to the case of communication lines; there is no need to selectively use different pieces of identification information, e.g., telephone numbers and network addresses, to identify the same communication partner depending on the communication lines. This can greatly reduce the load on the user.

Figure 5:
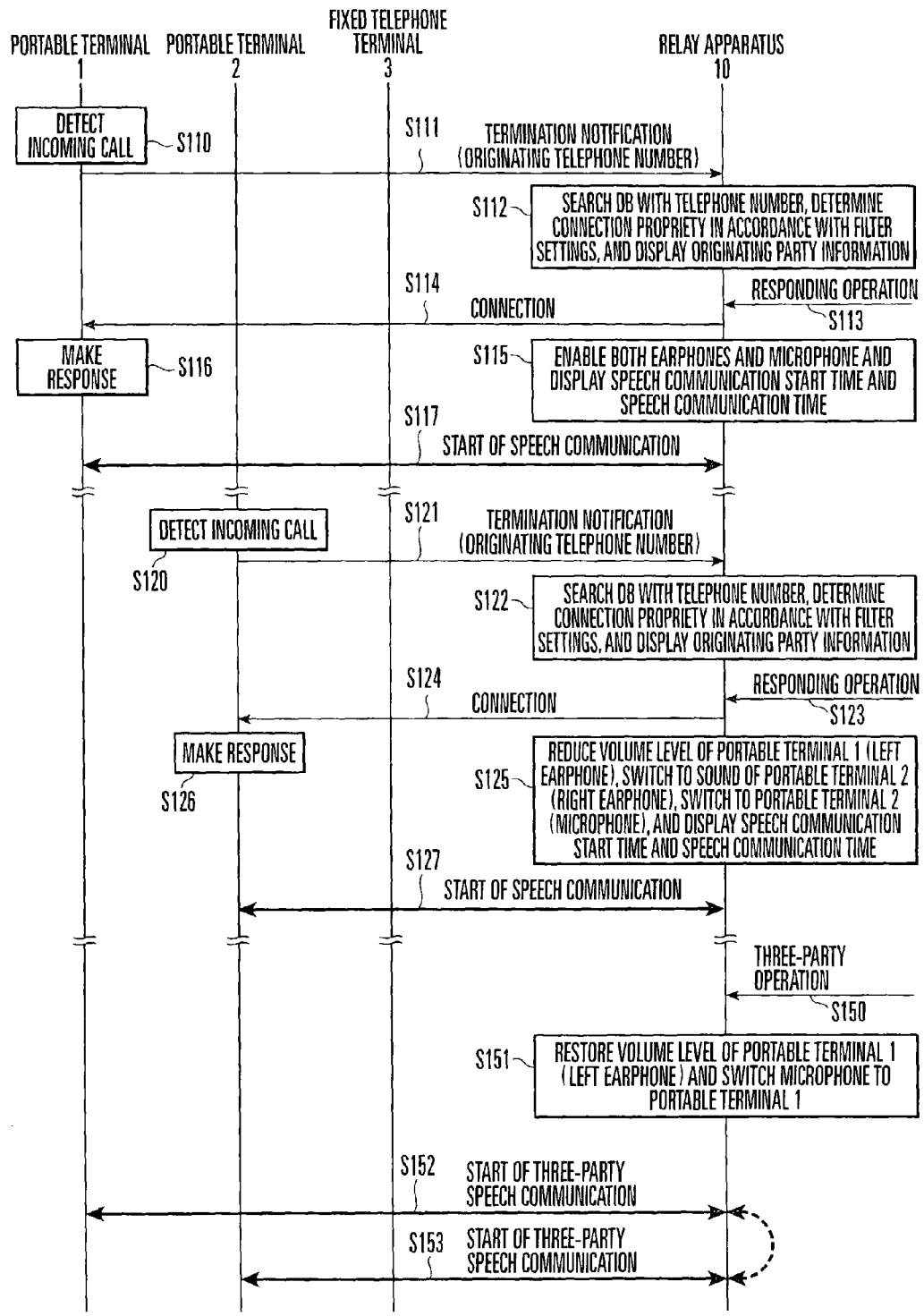
FIG. 5 is a sequence chart showing operation for three-party speech communication.

Operation for three-party speech communication will be described next with reference to FIG. 5. Consider a case wherein three-party speech communication is performed between the portable terminal 1, the portable terminal 2, and the relay apparatus 10.

Assume that in the following operation, the relay apparatus 10 has responded to an incoming call to the portable terminal 2 after responding to an incoming call to the portable terminal 1 by the operation in FIG. 4 described above (steps S110 to S127).

At this time, the volume level of speech communication through the portable terminal 1 which is produced from the right earphone 22A is reduced, and the sound of speech communication through the portable terminal 2 is output from the left earphone 22B. The microphone 22C has been switched to the speech communication through the portable terminal 2.

When the user is to shift to three-party speech communication between the portable terminal 1, the portable terminal 2, and the fixed telephone terminal 3 in this state, he/she performs three-party speech communication starting operation (step S150). The call control section 21A of the relay apparatus 10 detects this three-party speech communication starting operation through the operation input section 25, and instructs the speech communication processing section 21B to start three-party speech communication.

In response to this instruction, the speech communication processing section 21B restores the sound of speech communication through the portable terminal 1 which is produced from the right earphone 22A, and connects the microphone 22C to both the portable terminal 1 and the portable terminal 2 (step S151).

With this operation, speech communication through the portable terminal 1 and speech communication through the portable terminal 2 are connected through the relay apparatus 10 to start three-party speech communication (steps S152 and S153).

Figure 6:
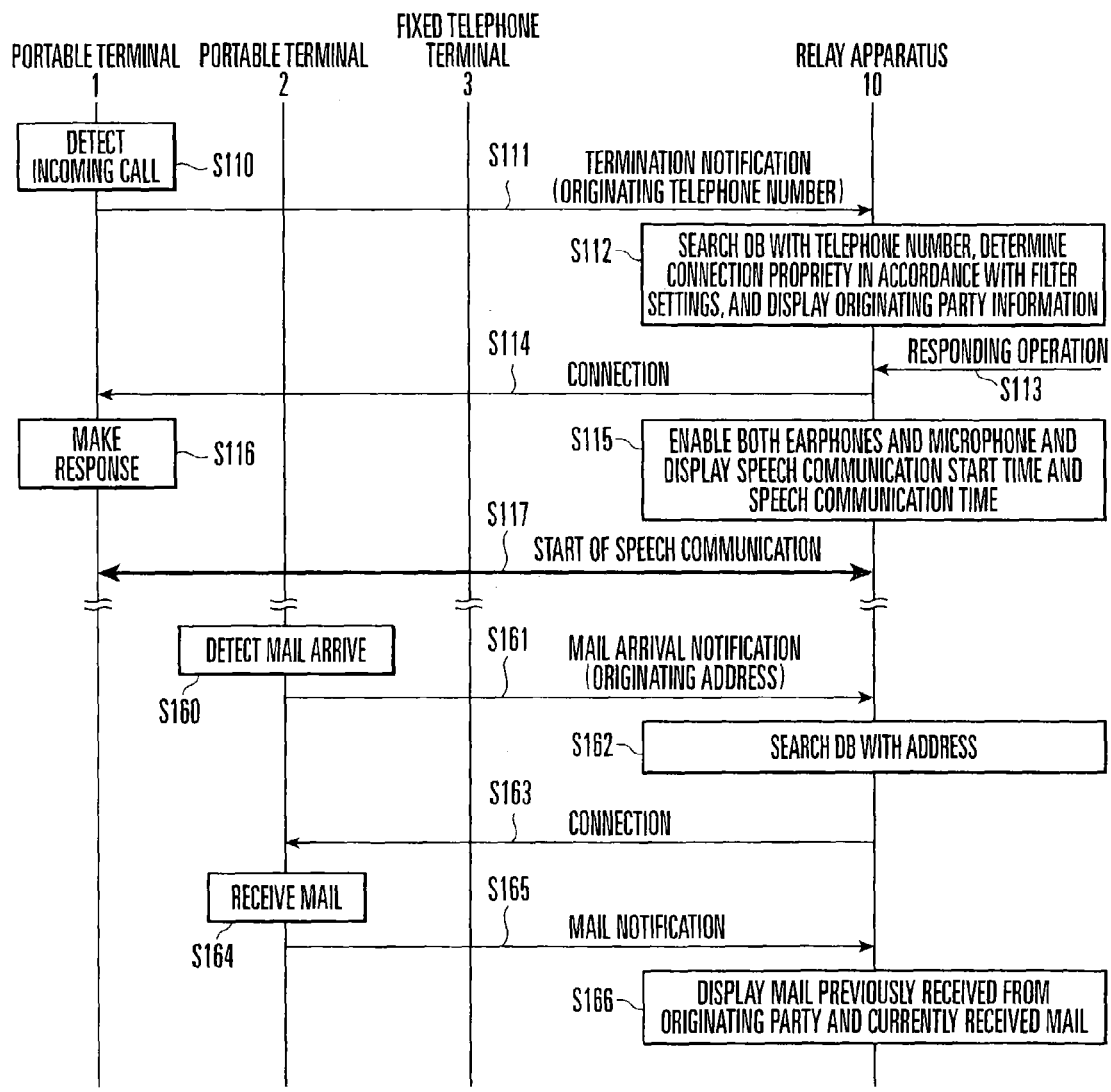
FIG. 6 is a sequence chart showing operation for a case wherein mail is received during speech communication.

Operation for mail arrival during speech communication will be described next with reference to FIG. 6. Consider a case wherein the user is to receive mail through the portable terminal 2 while performing speech communication through the portable terminal 1.

Assume that in the following operation, the relay apparatus 10 has been in a speech communication state upon responding to an incoming call to the portable terminal 1 by the operation in FIG. 4 described above (steps S110 to S117).

When the portable terminal 2 detects mail arrival from the radio network 5 in this state (step S160), the portable terminal 2 notifies the relay apparatus 10 of the detection of the mail arrival and an originating mail address as a termination notification (step S161).

In response to this notification, the search section 21A1 of the call control section 21A of the relay apparatus 10 searches the DB 23 with the originating mail address as a key. With this key search, mail received in the past is read out from log information registered for each originating mail address (step S162).

The relay apparatus 10 then controls the relay section 12 to connect the terminal I/F section 11A to the mail processing section 21C of the communication control section 21 and instructs the portable terminal 2 to receive the mail (step S163).

In response to the reception instruction, the portable terminal 2 responds to the mail arrival from the radio network 5 (step S164) and transfers the mail from the radio network 5 to the mail processing section 21C (step S165).

The mail processing section 21C displays the previously received mail read out from the DB 23 in step S162 and the mail received from the portable terminal 2 in a display area 32 of the window display section which is set on a portion near the portable terminal 2 (step S166).

FIG. 7 shows a display example of the window display section 26. In this case, the name of the communication partner, a photograph of his/her face, and the time of speech communication are displayed in the display area 31 as communication partner information of speech communication through the portable terminal 1.

In the display area 32, the mail received through the portable terminal 2 and the previously received mail are displayed.

Note that when the user is to perform Internet Web browsing operation or the like or image communication such as speech communication using moving images, the image processing section 21D is used in the same manner as the speech communication processing section 21B or mail processing section 21C.

According to the present invention, a plurality of communication means such as communication terminals and communication lines used by a user are individually connected through the external connection interface section, and the communication means are individually controlled by the common terminal section, commonly provided for the respective communication means, through the external connection interface section in accordance with operation by the user, thereby performing communication with desired communication partners using these communication means. This makes it possible to efficiently use a plurality of communication means.

In addition, pieces of unique communication information such as communication partner information and log information used for communication through the communication terminals are acquired from the respective communication terminals connected as communication means to the external connection interface section. These pieces of information are classified according to communication partners to be collectively managed in the database. This makes it possible to effectively use communication information to be handled in each communication means.

What is claimed is:

1. A relay apparatus for connection to a plurality of communication devices including portable terminals, fixed telephone terminals and a telephone line connected to a telephone network, said relay apparatus comprising:

an external interface (IF) section which independently controls each of the plurality of communication devices and includes separate interface sections for respective ones of the plurality of communication devices, and a common terminal section commonly provided for the respective ones of the plurality of communication devices connected to the external I/F section performing multiple kinds of communication including speech communication, electronic mail communication and image communication, the common terminal section including a control section connected to the external I/F section and including a call control section for controlling various kinds of communication calls, a speech communication processing section for performing speech communication, a mail processing section for exchanging electronic mail, an image processing section for performing image communication, a database management section, and a response determination section, said common terminal section further including a transmission/reception section connected to the speech communication processing section of the communication control section, a database (DB) connected to the communication control section and managed by the database management section, a storage section storing programs executed by the common terminal section, and a window display section, wherein said call control section performs call control for the respective ones of the plurality of communication devices on the basis of specifications set in advance in accordance with types and models of respective ones of the plurality of communication devices, said DB commonly performing collective management of communication information identifying communication partners, said DB having registered filter settings including limitations on origination and utilization time, call rejection and call limitations and termination propriety used to determine whether to respond to a new incoming call from another communication partner during speech communication, communication information held in each of said plurality of communication devices being stored in said DB when each communication device is connected to the relay apparatus.

2. A relay apparatus according to claim 1, wherein said window display means displays various kinds of information about communication, and common control means further comprises search means for retrieving communication information about a communication partner from said database, and said call control means displays the retrieval result obtained by said search means on said window display means.

3. A relay apparatus according to claim 1, wherein said database stores termination propriety condition information set for each communication partner, and said response determination means which, if during speech communication through one of the plurality of communication means, an incoming call is received through another communication means, determines the propriety of responding to the incoming call on the basis of termination propriety condition information about a communication partner, from said database, with which the speech communication is being performed.

4. A relay apparatus according to claim 1, wherein said external connection interface means comprises at least one of terminal interface means for interfacing with a terminal and line interface means for a line.

5. A relay apparatus according to claim 4, further comprising relay means for relaying/connecting said terminal interface means and said line interface means to said control means.

6. A relay apparatus according to claim 1, wherein the communication devices comprise at least one of a portable terminal and a communication line, and perform various kinds of communication.

7. A relay apparatus according to claim 1, wherein said common terminal section further comprises an image sensing section which senses an image of the user when image communication is performed using a moving or still image.

8. A relay apparatus according to claim 1, wherein the relay apparatus is comprised of a main body formed from a rectangular housing and a lid member openably supported on the main body through a hinge section which, when the relay apparatus is not in use, is closed onto to the main body, said window display section being placed on an upper surface of the main body, said main body further including a plurality of spaces formed therein to at least partially house one or more portable terminals, said spaces having connectors for connecting said portable terminals to said external interface (I/F) section.

9. A relay apparatus as recited in claim 8, wherein said main body is further provided with modular jacks for connecting to a telephone line and a fixed telephone terminal, said lid member being having keys for an operation input section arranged on a surface of the lid member which becomes an upper surface in an open state.

10. A relay apparatus as recited in claim 1, wherein said relay apparatus is provided with housing means for mounting a plurality of portable terminals, said mounting means having connectors for connecting said portable terminals to said external interface (I/F) section, said call control section detecting a mounting operation of a portable terminal and receiving communication information stored in the portable terminal and registering the communication information in said database.

11. A relay apparatus as recited in claim 10, wherein said relay apparatus is provided with modular jacks for for connecting to a telephone line and a fixed telephone terminal, said call control section detecting a connecting operation of a fixed telephone terminal and receiving communication information stored in the fixed telephone terminal and registering the communication information in said database.

12. A relay apparatus as recited in claim 1, wherein said transmission/reception section includes a right earphone, a left earphone and a microphone, wherein during a first call, when the user responds to a second incoming call, said speech communication processing section switches a volume level of speech communication for the first call to a reduced level in a first one of said right or left earphones and switches sound of speech communication from said second incoming call to a normal level in a second one of said right or left earphones and switches said microphone to speech communication mode for the second incoming call, whereby succeeding speech communication is performed without disconnecting the first call.

13. A relay apparatus as recited in claim 12, wherein when the user performs a switching operation to switch speech to the first call, said speech communication processing section switches the volume level to a normal level in the first one of said right or left earphones and the volume level to a reduced level in the second one of said right or left earphones and switches said microphone to speech communication mode for the first call.

14. A relay apparatus as recited in claim 12, wherein when the user performs a three-party speech communication operation, said speech communication processing section restores the volume level in the first one of said right or left earphones to a normal level and switches said microphone to speech communication for both the first call and the second incoming call.

* * * * *